United States Patent
Hou et al.

(10) Patent No.: US 10,175,671 B2
(45) Date of Patent: Jan. 8, 2019

(54) METHOD AND APPARATUS FOR CONTROLLING INTELLIGENT DEVICE

(71) Applicant: Xiaomi Inc., Beijing (CN)

(72) Inventors: Enxing Hou, Beijing (CN); Benchang Su, Beijing (CN); Sitai Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 207 days.

(21) Appl. No.: 15/000,915

(22) Filed: Jan. 19, 2016

(65) Prior Publication Data

US 2017/0017218 A1    Jan. 19, 2017

(30) Foreign Application Priority Data

Jul. 13, 2015  (CN) .......................... 2015 1 0408667

(51) Int. Cl.
  *G05B 19/042*   (2006.01)
  *H04W 4/80*    (2018.01)
  *H04L 12/28*   (2006.01)

(52) U.S. Cl.
  CPC ...... *G05B 19/0426* (2013.01); *H04L 12/2827* (2013.01); *H04W 4/80* (2018.02)

(58) Field of Classification Search
  CPC . G05B 19/0426; H04L 12/2827; H04W 4/008
  See application file for complete search history.

(56) References Cited

U.S. PATENT DOCUMENTS

| | | | |
|---|---|---|---|
| 8,554,376 B1 | 10/2013 | Matsuoka | |
| 9,400,898 B2 * | 7/2016 | Hagedorn | ............ G06K 7/0008 |
| 2010/0271252 A1 * | 10/2010 | Musschebroeck | ..... G08C 17/02 |
| | | | 341/176 |
| 2010/0289643 A1 * | 11/2010 | Trundle | ............... F24F 11/0086 |
| | | | 340/545.1 |

(Continued)

FOREIGN PATENT DOCUMENTS

| | | |
|---|---|---|
| CN | 102768514 A | 11/2012 |
| CN | 102882751 A | 1/2013 |

(Continued)

OTHER PUBLICATIONS

Machine translation of CN 103533542, Yang Xin, Method and apparatus for establishing wireless connection between electronic devices, Jan. 22, 2014, 6 pages.*

(Continued)

*Primary Examiner* — Chun Cao
(74) *Attorney, Agent, or Firm* — Arch & Lake LLP

(57) ABSTRACT

A method and an apparatus are provided for controlling one or more intelligent devices. In the method, the apparatus stores configuration information that includes at least one identification that identifies at least one intelligent device, an execution operation corresponding to each intelligent device, and an execution condition corresponding to each execution operation. When a target execution condition is satisfied, the apparatus determines a target intelligent device and a target execution operation corresponding to the target execution condition by querying the configuration informa- (Continued)

tion according to the target execution condition. The apparatus then instructs the target intelligent device to perform the target execution operation.

17 Claims, 4 Drawing Sheets

(56) References Cited

U.S. PATENT DOCUMENTS

| | | | |
|---|---|---|---|
| 2011/0106279 A1 | 5/2011 | Cho et al. | |
| 2012/0302200 A1* | 11/2012 | Esbensen | H04W 4/90 |
| | | | 455/404.2 |
| 2013/0084811 A1 | 4/2013 | Yoon | |
| 2014/0081433 A1 | 3/2014 | Cheong et al. | |
| 2014/0085059 A1 | 3/2014 | Chen et al. | |
| 2014/0108019 A1 | 4/2014 | Ehsani et al. | |
| 2014/0121786 A1 | 5/2014 | Matsuoka et al. | |
| 2014/0236360 A1 | 8/2014 | Matsuoka et al. | |
| 2014/0317029 A1 | 10/2014 | Matsuoka et al. | |
| 2015/0241078 A1 | 8/2015 | Matsuoka et al. | |

FOREIGN PATENT DOCUMENTS

| | | |
|---|---|---|
| CN | 102938729 A | 2/2013 |
| CN | 103825929 A | 5/2014 |
| CN | 104142659 A | 11/2014 |
| CN | 104216379 A | 12/2014 |
| CN | 104597761 A | 5/2015 |
| CN | 104767639 A | 7/2015 |
| JP | H09322263 A | 12/1997 |
| JP | 2014230123 A | 12/2014 |
| JP | 2015076775 A | 4/2015 |
| KR | 20140077127 A | 6/2014 |
| WO | 2011/053008 A2 | 5/2011 |
| WO | 2014002323 A1 | 1/2014 |

OTHER PUBLICATIONS

International Search Report (including English translation) issued in corresponding PCT Application No. PCT/2015/090594, dated Apr. 19, 2016, 8 pages.
Written Opinion of the International Searching Authority (including English translation) issued in corresponding PCT Application No. PCT/2015/090594, dated Apr. 19, 2016, 7 pages.
European Search Report issued in corresponding European Application No. 16 16 2021, dated Oct. 20, 2016, 7 pages.
Chinese Search Report issued in corresponding Chinese Application No. 201510408667.X, completed Mar. 28, 2017, 2 pages.
First Office Action (including English translation) issued in Chinese Application No. 201510408667.X, dated Apr. 6, 2017, 17 pages.
Search Report issued in corresponding Russian Application No. 2016103636/08, completed Feb. 6, 2017, 2 pages.
Office Action (including English translation) issued in corresponding Russian Application No. 2016103636/08, completed Feb. 6, 2017, 10 pages.
Office action from KIPO (including English language translation) for KR application 2016-7001396, dated Dec. 14, 2017, 9 pages.
Notification of Reasons for Refusal (including English translation) issued in corresponding Japanese Patent Application No. 2017-527965, dated Sep. 5, 2017, 7 pages.

* cited by examiner

METHOD AND APPARATUS FOR CONTROLLING INTELLIGENT DEVICE

CROSS-REFERENCE TO RELATED APPLICATION

This application is based on and claims priority to Chinese Patent Application No. 201510408667.X, filed Jul. 13, 2015, the entire contents of which are incorporated herein by reference.

FIELD

The present disclosure relates to a field of intelligent household, and more particularly, to a method and an apparatus for controlling one or more intelligent devices.

BACKGROUND

With the rapid development of society, the economic standard of people's life rises gradually, and intelligent household has crept into the daily life.

The intelligent household integrates various intelligent devices with a house as the platform by using advanced computer technology, network communication technology, comprehensive wiring technology, safety technology, automatic control technology and audiovisual technology. Efficient residential facilities and a management system of domestic affairs are established to make home life more comfortable, safe and efficient. Each intelligent device has a function of communication with remote control equipment by which each intelligent device is controlled to start or stop.

SUMMARY

In a first aspect of the present disclosure, there is provided a method for controlling one or more intelligent devices. In the method, the apparatus stores configuration information, where the configuration information includes at least one identifier that identifies at least one intelligent device, an execution operation corresponding to each intelligent device, and an execution condition corresponding to each execution operation. When a target execution condition is satisfied, the apparatus determines a target intelligent device and a target execution operation corresponding to the target execution condition by querying the configuration information according to a target execution condition. The apparatus instructs the target intelligent device to perform the target execution operation.

In a second aspect of the present disclosure, there is provided an apparatus for controlling one or more intelligent devices. The apparatus includes: a receiving module, a querying module, and a controlling module. The receiving module is configured to receive and store configuration information, where the configuration information includes at least one identifier that identifies at least one intelligent device, an execution operation corresponding to each intelligent device, and an execution condition corresponding to each execution operation. The querying module configured to query the configuration information received by the receiving module according to a target execution condition if the target execution condition is satisfied, and to determine a target intelligent device and a target execution operation corresponding to the target execution condition. The controlling module is configured to instruct the target intelligent device to perform the target execution operation.

In a third aspect of the present disclosure, there is provided an apparatus for controlling one or more intelligent devices. The apparatus includes: a processor; a memory configured to store an instruction executable by the processor. The instructions cause the processor to store configuration information, in which the configuration information includes at least one identifier that identifies at least one intelligent device, an execution operation corresponding to each intelligent device, and an execution condition corresponding to each execution operation. The instructions cause the processor to query the configuration information according to a target execution condition when the target execution condition is satisfied, and determine a target intelligent device and a target execution operation corresponding to the target execution condition. The instructions cause the processor to instruct the target intelligent device to perform the target execution operation.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
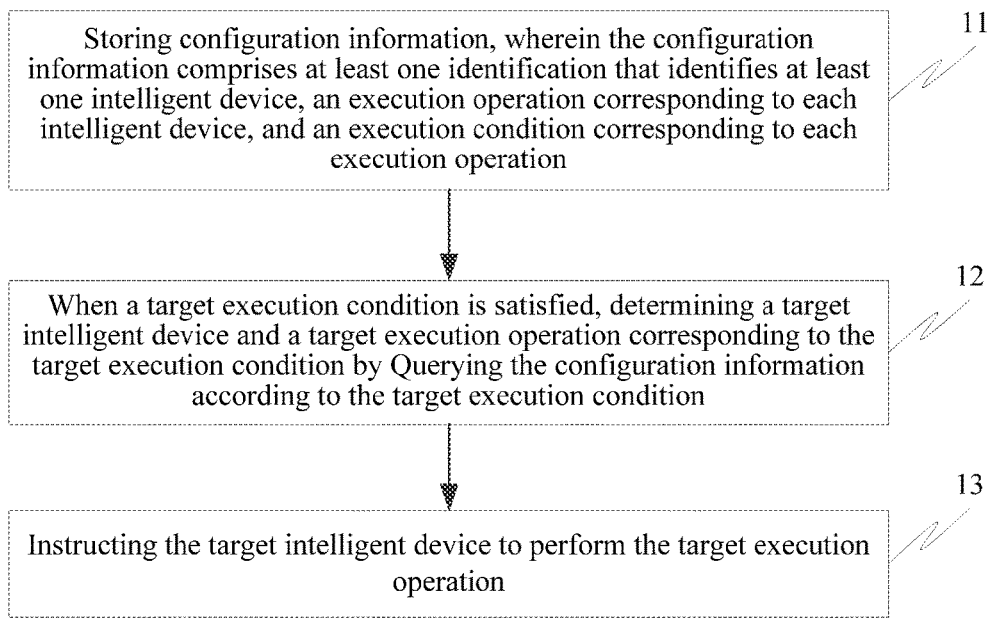
FIG. 1 is a flow chart of a method for controlling one or more intelligent devices according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

First of all, some terms mentioned in the embodiments of the present disclosure will be illustrated.

Intelligent Device: an intelligent device is applied in the intelligent household, has a function of communication with a remote control device, and includes various types, such as a fan, a refrigerator, an air conditioner, a TV, a router and the like.

Near Field Communication (NFC) Antenna: it is a near field coupled antenna which is specifically based on a radio frequency identification (RFID) technology, coupled and matched with a transformer for communication to deal a hardware processing scheme, in which the data transmission process is verified by a communication instruction of a processor; software and hardware environment is modulated and processed by RFID, and adjusted by a matching circuit.

NFC Technology: it is a short-distance high frequency wireless communication technology which allows data exchange by non-contact point-to-point data transmission (for example, within ten centimeters) between electronic devices. The technology is derived from non-contact RFID and is downward compatible with RFID. Compared with infrared communication and Bluetooth communication, NFC employs a specific signal attenuation technology, which leads to short communication distance and high safety, and is suitable for identity recognition and secure payment.

NFC Tag: it is a tag which has a working frequency of 13.56 MHz and is compatible with ISO14443A/B standard based on the NFC technology. The NFC tag can store various readable information, such as personal information, payment information, Bluetooth address information and Wi-Fi address information. The NFC tag of the present disclosure at least includes configuration information of the intelligent device, such as starting of the intelligent device and stopping of the intelligent device.

FIG. 1 is a flow chart of a method for controlling one or more intelligent devices according to an exemplary embodiment. The executive body is an apparatus for controlling one or more intelligent devices. As shown in FIG. 1, the method may be implemented at least partially by a terminal, including the following steps. The terminal may include a smart phone, a wearable device, or any other electronic device including a processor.

In step 11, the apparatus stores configuration information that includes at least one identification that identifies at least one intelligent device, an execution operation corresponding to each intelligent device, and an execution condition corresponding to each execution operation. For example, the apparatus may receive and store configuration information set by a user, where the configuration information may include identification that identifies at least one intelligent device connected to the same home network, an execution operation corresponding to each intelligent device, and an execution condition corresponding to each execution operation.

In step 12, when a target execution condition is satisfied, the apparatus determines a target intelligent device and a target execution operation corresponding to the target execution condition by querying the configuration information according to the target execution condition. For example, when the target execution condition is satisfied, the target intelligent device and the target execution operation corresponding to the target execution condition are determined based on the stored configuration information. The target execution condition may include a preset condition including user inputs and sensor inputs. The user inputs may be selected based on history data related to the target intelligent device. The sensor inputs may provide real time information about the target intelligent device. For example, the sensor inputs may include ambient temperature, internal temperature of the target intelligent device, power consumption of the target intelligent device, etc.

In step 13, the apparatus instructs the target intelligent device to perform the target execution operation.

According to the disclosure, the user may set the intelligent device to be controlled automatically by the above apparatus, and set corresponding execution operations and execution conditions in the light of personal habits. Thus, the user may control the corresponding intelligent device in accordance with the control instructions preconfigured, which not only satisfies personalized requirements, but also brings great convenience to the user.

Figure 2:
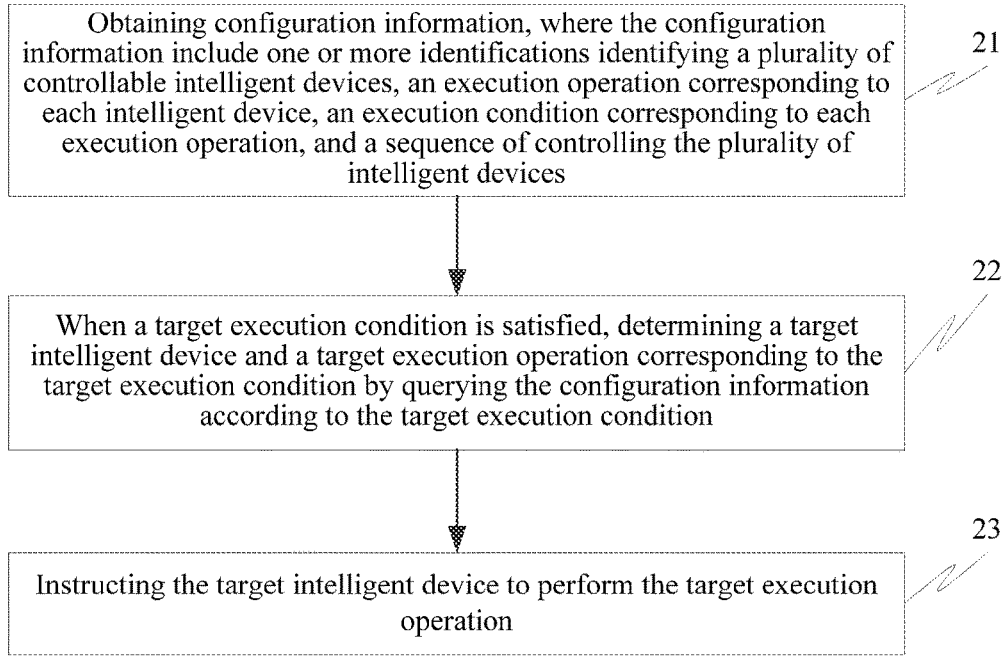
FIG. 2 is a flow chart of a method for controlling one or more intelligent devices according to another exemplary embodiment.

FIG. 2 is a flow chart of a method for controlling one or more intelligent devices according to another exemplary embodiment. The executive body is an apparatus for controlling one or more intelligent devices. As shown in FIG. 2, the method may be at least partially implemented by a terminal, including the following steps.

In step 21, the apparatus obtains configuration information, where the configuration information includes one or more identifications identifying a plurality of intelligent devices. The configuration information may further include an execution operation corresponding to each intelligent device, an execution condition corresponding to each execution operation, and a sequence of controlling the plurality of intelligent devices. Here, the sequence of controlling the devices is an operation rule for the related intelligent devices. For example, the sequence may instruct the devices to perform certain operations one device after another device following a particular order set by the user. Alternatively or additionally, the sequence may also include two or more devices to collaborate and work simultaneously. The one or more identifications may include a group identification that identifies the plurality of intelligent devices. Alternatively or additionally, the one or more identifications may include a device identification that identifies each intelligent device. The sequence of controlling may set a particular order that how the plurality of intelligent devices perform each execution operation.

In step 22, when a target execution condition is satisfied, the apparatus may determine a target intelligent device and a target execution operation corresponding to the target execution condition by querying the configuration information according to the target execution condition.

The target execution condition may include one of the execution conditions in step 21, and the target intelligent device and the target execution operation may be the intelligent device and the execution operation corresponding to the target execution condition respectively.

In step 23, the target intelligent device is instructed to perform the target execution operation.

The apparatus for controlling the intelligent device herein may include a smart watch and a mobile terminal. The control instruction may include one of the following instructions: key trigger on the apparatus, touch trigger of the display screen of the apparatus, trigger caused because movement amplitude of the apparatus reaches a threshold, trigger caused because steps of the user counted by the apparatus reaches a threshold, alarm trigger of the apparatus, vibration trigger of the apparatus, and etc.

For example, the plurality of intelligent devices include a TV, a refrigerator, a fan, and the corresponding execution operation is the starting operation, in which the execution condition corresponding to the starting operation of the TV is that the alarm of the apparatus is started; the execution condition corresponding to the starting operation of the refrigerator is that the pressure on the display screen of the apparatus reaches a threshold; the execution condition corresponding to the starting operation of the fan is vibration of the apparatus. The sequence of controlling the intelligent devices may require that the TV operates first, the refrigerator operates second, and the fan operates last. Note that the particular sequence here is just an example and the sequence may be set and modified by the user. All the above is the content of the configuration information. Supposing the alarm of the apparatus is started, the apparatus queries the configuration information and controls the TV, the refrigerator, and the fan to start sequentially according to the query result. That is, coordinated trigger of the plurality of intelligent devices may be realized when one execution condition is satisfied. Supposing the pressure on the display screen of the apparatus reaches a threshold, the apparatus queries the configuration information and controls the refrigerator and the fan to start sequentially according to the query result, such that coordinated trigger of the plurality of intelligent devices may be realized once one execution condition is satisfied.

According to the disclosure, the user may set the intelligent device to be controlled automatically by the above apparatus, and set corresponding execution operations and execution conditions in the light of personal habits, such that the user can control the corresponding intelligent device in accordance with the control instructions preconfigured, and can realize the coordinated trigger of the plurality of intelligent devices by setting the sequence of controlling the plurality of intelligent devices, which not only satisfies personalized requirements, but also brings great convenience to the user.

Figure 3:
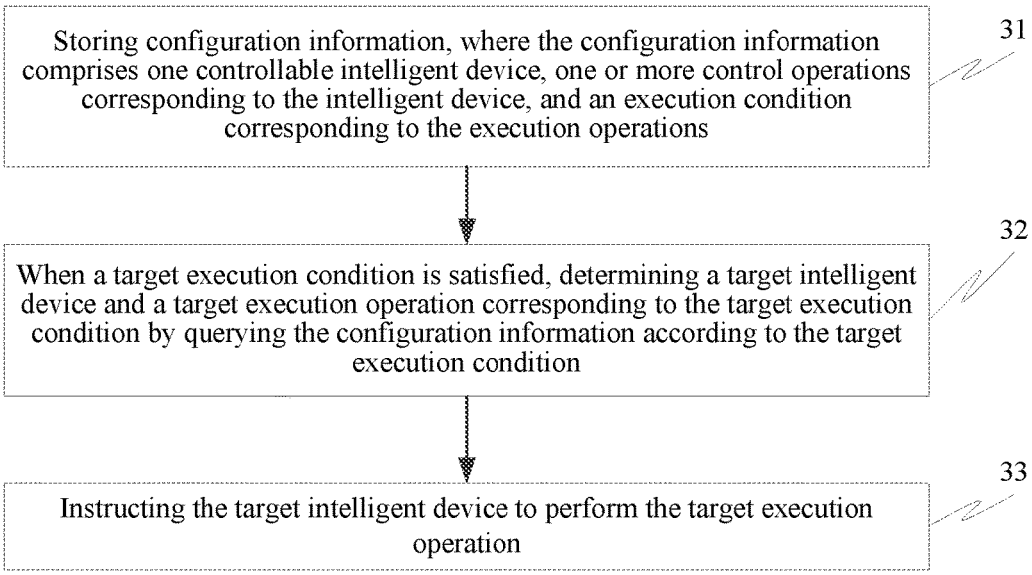
FIG. 3 is a flow chart of a method for controlling one or more intelligent devices according to another exemplary embodiment.

FIG. 3 is a flow chart of a method for controlling one or more intelligent devices according to another exemplary embodiment. The executive body is an apparatus for controlling one or more intelligent devices. As shown in FIG. 3, the method is applied to a terminal, including the following steps.

In step 31, the apparatus stores configuration information, in which the configuration information includes one controllable intelligent device, one or more control operations executed on the intelligent device, and an execution condition corresponding to each execution operation. The apparatus may receive configuration information set by a user from the intelligent device. Alternatively or additionally, the apparatus may receive configuration information set by the user from the apparatus itself.

In step 32, When a target execution condition is satisfied, the apparatus determines a target intelligent device and a target execution operation corresponding to the target execution condition by querying the configuration information according to a target execution condition. For example, the apparatus may compare the sensor input with the preset value in the target execution condition to determine whether a target execution condition is satisfied. When the target execution condition is satisfied, the apparatus may query to stored configuration information to determine the target execution operation to be performed by the target intelligent device.

The target execution condition may include one of the execution conditions in step 31, and the target intelligent device and the target execution operation may be the intelligent device and the execution operation corresponding to the target execution condition, respectively.

In step 33, the target intelligent device is instructed to perform the target execution operation.

In the following, the examples of a plurality of control operations executed on the intelligent device are elaborated. In one or more embodiments, the intelligent device is an air conditioner; the plurality of control operations are starting and reducing the cooling temperature by 1° C.; the execution conditions involve the number of steps of the user counted by the apparatus reaching a first threshold and the pressure on the display screen of the apparatus reaching a second threshold, all of which are the content of the configuration information. Hence, when the number of steps counted by the apparatus reaches a first threshold, the apparatus queries the configuration information, instructs the air conditioner to start according to the query result, and reduces the cooling temperature by 1° C. The apparatus may be a wearable device carried with the user. If the user finds that the temperature does not reach a desired temperature, the user may touch the display screen of the apparatus to make the pressure reach a preset threshold, so as to control the air conditioner to lower the cooling temperature by 1° C. again.

According to the disclosure, the user may set the intelligent device to be controlled automatically by the above apparatus, and set corresponding execution operations and execution conditions in the light of personal habits, such that the user can control the corresponding intelligent device in accordance with the control instructions preconfigured. The disclosed method and apparatus not only satisfy personalized requirements, but also bring great convenience to the user.

Additionally or alternatively, the configuration information may include a sequence of controlling the plurality of intelligent devices, and multiple control operations executed on at least one of the intelligent devices. The multiple control operations may be executed according to the particular order of the sequence of controlling the plurality of intelligent devices.

For example, the plurality of intelligent devices include a TV, a refrigerator, a fan, and an air conditioner, in which the corresponding execution operation of the TV, the refrigerator, and the fan is the starting operation, and the corresponding execution operations of the air conditioner involve starting and reducing the cooling temperature by 1° C. The execution condition corresponding to starting of the air conditioner is that the number of steps of the user counted by the apparatus reaches a first threshold; the execution condition corresponding to reducing the cooling temperature by 1° C. is that a preset button on the apparatus is pressed down. The execution condition corresponding to the starting operation of the TV is that the alarm of the apparatus is started; the execution condition corresponding to the starting operation of the refrigerator is that the pressure on the display screen of the apparatus reaches a second threshold; the execution condition corresponding to the starting operation of the fan is vibration of the apparatus. The sequence of controlling the intelligent devices may require that the air conditioner operates first, the TV operates second, the refrigerator operates third, and the fan operates last. Note that the particular sequence here is just an example and the sequence may be set and modified by the user. All the above is the content of the configuration information. Supposing that the number of steps of the user counted by the apparatus reaches a first threshold, the apparatus queries the configuration information and controls the air conditioner, the TV, the refrigerator and the fan to start sequentially according to the query result, and the air conditioner reduces the cooling temperature by 1° C. after being started. That is, coordinated trigger of the plurality of intelligent devices may be realized when one execution condition is satisfied.

Figure 4:
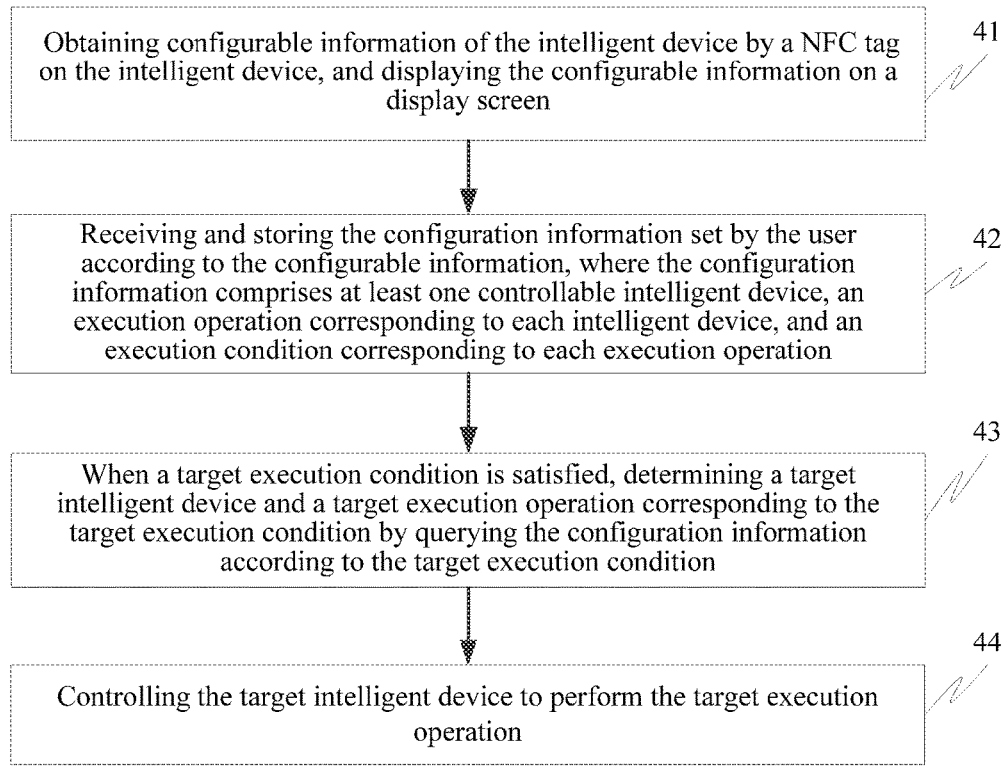
FIG. 4 is a flow chart of a method for controlling one or more intelligent devices according to another exemplary embodiment.

FIG. 4 is a flow chart of a method for controlling one or more intelligent devices according to another exemplary embodiment. The executive body may be an apparatus for controlling one or more intelligent devices. As shown in FIG. 4, the method is applied to a terminal, including the following steps.

In step 41, the apparatus may obtain configurable information of the intelligent device by a NFC tag on the intelligent device, and display the configurable information of the intelligent device on a display screen. The apparatus may display the information of the intelligent device on a display screen of the apparatus. Alternatively or additionally, the apparatus may instruct other device to display the information of the intelligent device on a display screen of the other device.

The step of obtaining the configurable information of the intelligent device by the NFC tag on the intelligent device may include following acts: activating the NFC tag on the intelligent device by a NFC antenna with a near field communication technology; establishing NFC connection with the intelligent device; and obtaining the configurable information of the intelligent device stored in the NFC tag.

The configurable information refers to the execution operations capable of controlling the intelligent device, such as starting of the intelligent device and stopping of the intelligent device. An example where the apparatus is a smart watch and the intelligent device is an air conditioner is illustrated. When the smart watch approaches the NFC tag on the intelligent device till a preset distance, for example 10 cm, the smart watch may obtain the configurable information of the intelligent device pre-stored in the NFC tag, such as the identification information of the intelligent device, the starting operation, the stopping operation, the operation of temperature increase, and the operation of temperature reduction, and the information may be displayed in the display screen of the smart watch. The user may see the information on the display screen of the smart watch, and select which execution operation needs to be configured.

In step 42, the configuration information set by the user according to the configurable information of the intelligent device is received and stored, in which the configuration information includes at least one identifier that identifies at least one intelligent device, an execution operation corresponding to each intelligent device, and an execution condition corresponding to each execution operation. For example, the apparatus may receive configuration information set by the user according to the information of the intelligent device and stores the configuration information in a local storage or in a remote server.

In this step, the intelligent device is controlled in the same way as any of the above embodiments, which will not be further elaborated.

In step 43, When a target execution condition is satisfied, the apparatus determines a target intelligent device and a target execution operation corresponding to the target execution condition by querying the configuration information according to the target execution condition.

The target execution condition may include one of the execution conditions in step 42, and the target intelligent device and the target execution operation may be the intelligent device and the execution operation corresponding to the target execution condition respectively.

In step 44, the target intelligent device is instructed to perform the target execution operation.

In the disclosure, the user may obtain the configurable information of the intelligent device first, then set the intelligent device according to the configurable information, and set the intelligent device to be controlled automatically, and set corresponding execution operations and execution conditions in the light of personal habits, such that the user can control the corresponding intelligent device in accordance with the control instructions preconfigured, which not only satisfies personalized requirements, but also brings great convenience to the user.

The execution conditions of each of the above embodiments may include at least one of the following conditions. The button on the apparatus is pressed down; the pressure imposed on the display screen of the apparatus reaches a first threshold; the movement amplitude of the apparatus reaches a second threshold; the number of steps of the user counted by the apparatus reaches a third threshold; the alarm of the apparatus is started; and the apparatus vibrates.

Of course, the execution conditions may be set as other conditions in the light of practical requirements, which will not be explained in detail.

In the above embodiments, the apparatus for controlling the intelligent device may be a smart watch or a mobile terminal, and the mobile terminal may involve a mobile phone, a smart bracelet or the like.

In addition, the execution operations of the above embodiments may include at least one of the following operations: starting of the intelligent device, stopping of the intelligent device, temperature regulation of the intelligent device, and air speed adjustment of the intelligent device. For example, various intelligent devices may have the starting and stopping operations; for a refrigerator or an air conditioner, there may be an operation of temperature regulation; for a fan or an air conditioner, there may be an operation of air speed adjustment. The execution operation of the intelligent device may be set according to the function that the corresponding intelligent device has. The execution operation corresponds to the configurable information of the intelligent device.

Moreover, the configuration information set by the user may be received in two manners: receiving the configuration information determined by the user in the apparatus; or receiving the configuration information sent by the user via the configuration terminal.

For example, the apparatus is the smart watch, and hence the user may set the configuration information directly on the display screen of the smart watch; or the user may set the configuration information via the mobile phone and send the configuration information to the smart watch, and then the smart watch stores the configuration information.

Alternatively or additionally, for the above embodiment, the step of controlling the target intelligent device to perform the target execution operation includes: sending encoded information to the target intelligent device via Bluetooth, or in a manner of sending an infrared signal or sending a wireless signal based on WIFI, in which the encoded information includes the target execution operation of the target intelligent device, such that the target intelligent device performs the target execution operation according to the encoded information.

Figure 5:
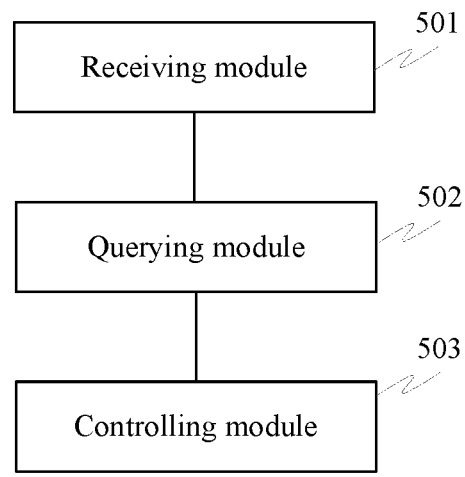
FIG. 5 is a schematic diagram of an apparatus for controlling one or more intelligent devices according to an exemplary embodiment.

FIG. 5 is a schematic diagram of an apparatus for controlling one or more intelligent devices according to an exemplary embodiment. Referring to FIG. 5, the apparatus includes a receiving module 501, a querying module 502, and a controlling module 503. The modules may be implemented in many different ways and in many different combinations of hardware and software. For example, all or parts of the implementations may be circuitry that includes an instruction processor, such as a CPU, microcontroller, or a microprocessor; or as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components; or as circuitry that includes discrete logic or other circuit components, including analog circuit components, digital circuit components or both; or any combination thereof.

The receiving module 501 is configured to receive and store configuration information set by a user, in which the configuration information includes at least one identifier that identifies at least one intelligent device, an execution operation corresponding to each intelligent device, and an execution condition corresponding to each execution operation. The querying module 502 is configured to query the configuration information received by the receiving module 501 according to a target execution condition if the target execution condition is satisfied, and to determine a target intelligent device and a target execution operation corresponding to the target execution condition. The controlling module 503 is configured to control the target intelligent device determined by the querying module 502 to perform the target execution operation determined by the querying module 502.

The apparatus may be a watch or a mobile terminal, and the configuration information includes a plurality of intelligent devices and further includes a sequence of controlling the plurality of intelligent devices. Alternatively, the execution operation may include one or more control operations executed on one intelligent device.

For the apparatus in the above embodiment, the specific way for the execution operation of each module has been described in detail in the embodiment concerning the method, which will not be further explained herein.

In the apparatus provided in this embodiment, the user may set the intelligent device to be controlled automatically by the above apparatus, and set corresponding execution operations and execution conditions in the light of personal habits, such that the user can control the corresponding intelligent device in accordance with the control instructions preconfigured, which not only satisfies personalized requirements, but also brings great convenience to the user.

The execution operation in the above embodiments may include at least one of starting of the intelligent device, stopping of the intelligent device, temperature regulation of the intelligent device, and air speed adjustment of the intelligent device.

Alternatively or additionally, the receiving module 501 in the above embodiment is configured to receive the configuration information determined by the user in the apparatus; or to receive the configuration information sent by the user via the configuration terminal.

Alternatively or additionally, the controlling module 503 in the above embodiment is configured to send encoded information to the target intelligent device determined by the querying module 502 via Bluetooth, or in a manner of sending an infrared signal or sending a wireless signal based on WIFI, in which the encoded information includes the target execution operation of the target intelligent device, such that the target intelligent device determined by the querying module 502 performs the target execution operation according to the encoded information.

Figure 6:
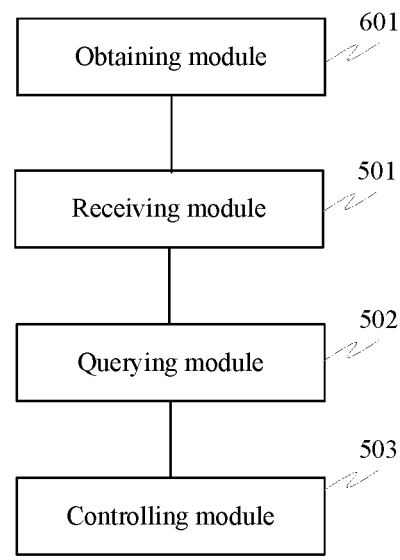
FIG. 6 is a schematic diagram of an apparatus for controlling one or more intelligent devices according to another exemplary embodiment.

FIG. 6 is a schematic diagram of an apparatus for controlling one or more intelligent devices according to another exemplary embodiment. Referring to FIG. 6, the apparatus includes a receiving module 501, a querying module 502, and a controlling module 503, and further includes an obtaining module 601 configured to obtain configurable information of the intelligent device by a NFC tag on the intelligent device, and to display the information of the intelligent device on a display screen. Accordingly, the receiving module 501 is configured to receive the configuration information set by the user according to the information of the intelligent device obtained by the obtaining module 601 and to store the configuration information, in which the configuration information includes at least one identifier that identifies at least one intelligent device, an execution operation corresponding to each intelligent device, and an execution condition corresponding to each execution operation. The specific operations of the querying module 502, and the controlling module 503 are consistent with the above embodiment, which will not be further elaborated.

The obtaining module 601 is configured to activate the NFC tag on the intelligent device by a NFC antenna with a near field communication technology, to establish NFC connection with the intelligent device, and to obtain the configurable information of the intelligent device stored in the NFC tag.

For the apparatus in the above embodiment, the specific way for the execution operation of each module has been described in detail in the embodiment concerning the method, which will not be further explained herein.

In the disclosure, the user may obtain the configurable information of the intelligent device first, then set the intelligent device according to the configurable information, and set the intelligent device to be controlled automatically, and set corresponding execution operations and execution conditions in the light of personal habits, such that the user can control the corresponding intelligent device in accordance with the control instructions preconfigured, which not only satisfies personalized requirements, but also brings great convenience to the user.

Figure 7:
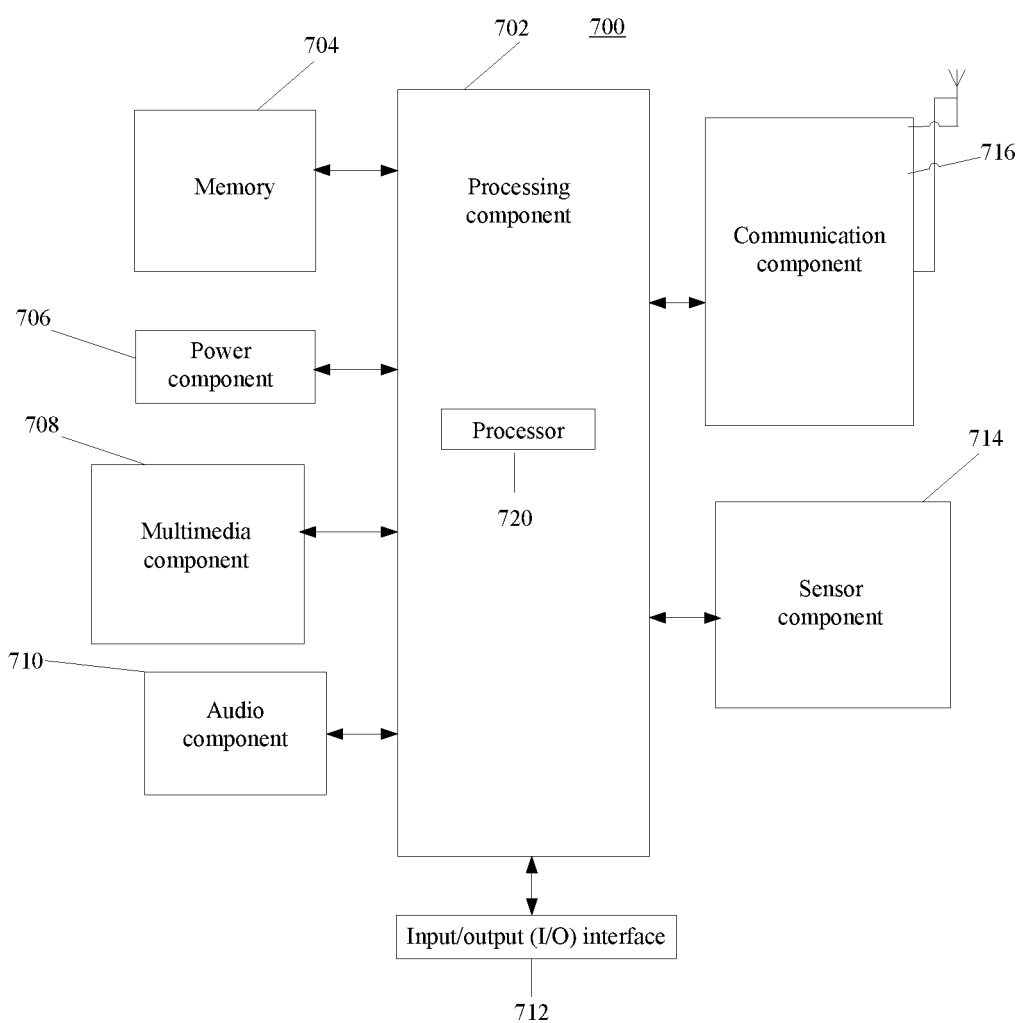
FIG. 7 is a schematic diagram of an apparatus for controlling one or more intelligent devices according to another exemplary embodiment.

FIG. 7 is a schematic diagram of an apparatus for controlling one or more intelligent devices according to another exemplary embodiment. The apparatus 700 may be a mobile phone, a computer, a digital broadcast terminal, a messaging device, a gaming console, a tablet, a medical device, exercise equipment, a personal digital assistant and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as Wi-Fi, 2G; or 3G; or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

The present disclosure provides a non-transitory computer-readable storage medium, when the instructions in the storage medium are executed by the processor of the mobile terminal, the mobile terminal is able to execute a method for controlling one or more intelligent devices, including: a processor and a memory configured to store an instruction executable by the processor.

The processor may be configured to receive and store configuration information set by a user, in which the configuration information includes at least one identifier that identifies at least one intelligent device, an execution operation corresponding to each intelligent device, and an execution condition corresponding to each execution operation; to query the configuration information according to a target execution condition if the target execution condition is satisfied, and determine a target intelligent device and a target execution operation corresponding to the target execution condition; and to instruct the target intelligent device to perform the target execution operation.

The specific operations of the processor may be identical to the above embodiments. The methods, devices, and modules described above may be implemented in many different ways and in many different combinations of hardware and software. For example, all or parts of the implementations may be a processing circuitry that includes an instruction processor, such as a CPU, microcontroller, a microprocessor; ASICs, DSPs, DSPDs, PLDs, FPGAs, controllers, micro-controllers, microprocessors, other electronic components. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Each module disclosed may take the form of a packaged functional hardware unit designed for use with other components, a portion of a program code (e.g., software or firmware) executable by the processor 720, the processing circuitry that usually performs a particular function of related functions, or a self-contained hardware or software component that interfaces with a larger system, for example.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:
storing configuration information, wherein the configuration information comprises identifications that identify a plurality of intelligent devices, a sequence of controlling the plurality of intelligent devices, an execution operation corresponding to each intelligent device, and an execution condition corresponding to each execution operation; wherein the plurality of target intelligent devices comprise a target intelligent device corresponding to a target execution condition in the configuration information and other intelligent devices following a target execution operation of the target intelligent device in the sequence; and the target execution operation comprises the execution operation corresponding to the target intelligent device, when the target execution condition is satisfied, determining a target intelligent device and the target execution operation by querying the configuration information according to the target execution condition; and instructing the target intelligent device to perform the target execution operation; and instructing other intelligent devices following the target execution operation of the intelligent device to perform corresponding target execution operations according to the sequence pre-stored in the target intelligent device.

2. The method according to claim 1, wherein the execution operation comprises: one or more control operations executed on one intelligent device.

3. The method according to claim 1, wherein the execution operation comprises at least one of starting of the intelligent device, stopping of the intelligent device, temperature regulation of the intelligent device, and air speed adjustment of the intelligent device.

4. The method according to claim 1, wherein instructing the target intelligent device to perform the target execution operation comprises:
sending encoded information to the target intelligent device via Bluetooth, or in a manner of sending an infrared signal or sending a wireless signal based on WIFI;
wherein the encoded information comprises the target execution operation of the target intelligent device, such that the target intelligent device performs the target execution operation according to the encoded information.

5. The method according to claim 1, further comprising:
obtaining configurable information of the intelligent device by a Near Field Communication (NFC) tag on the intelligent device, and displaying the information of the intelligent device on a display screen; and
receiving the configuration information set by a user according to the information of the intelligent device.

6. The method according to claim 5, wherein obtaining configurable information of the intelligent device by the NFC tag on the intelligent device comprises:
activating the NFC tag on the intelligent device by a NFC antenna with a near field communication technology;
establishing NFC connection with the intelligent device; and
obtaining the configurable information of the intelligent device stored in the NFC tag.

7. An apparatus, comprising:
a processor;
a memory configured to store an instruction executable by the processor;
wherein the processor is configured to:
store configuration information, wherein the configuration information comprises identifications that identify a plurality of intelligent devices, a sequence of controlling the plurality of intelligent devices, an execution operation corresponding to each intelligent device, and an execution condition corresponding to each execution operation; wherein the plurality of target intelligent devices comprise a target intelligent device corresponding to a target execution condition in the configuration information and other intelligent devices following a target execution operation of the target intelligent device in the sequence; and the target execution operation comprises the execution operation corresponding to the target intelligent device, when the target execution condition is satisfied, determine a target intelligent device and the target execution operation by querying the configuration information according to the target execution condition;

instruct the target intelligent device to perform the target execution operation; and instruct other intelligent devices following the target execution operation of the intelligent device to perform corresponding target execution operations according to the sequence pre-stored in the target intelligent device.

8. The apparatus according to claim 7, wherein the execution operation comprises: one or more control operations executed on one intelligent device.

9. The apparatus according to claim 7, wherein the execution operation comprises at least one of starting of the intelligent device, stopping of the intelligent device, temperature regulation of the intelligent device, and air speed adjustment of the intelligent device.

10. The apparatus according to claim 7, wherein the processor is configured to instruct the target intelligent device to perform the target execution operation by:

sending encoded information to the target intelligent device via Bluetooth, or in a manner of sending an infrared signal or sending a wireless signal based on WIFI;

wherein the encoded information comprises the target execution operation of the target intelligent device, such that the target intelligent device performs the target execution operation according to the encoded information.

11. The apparatus according to claim 7, wherein the processor is further configured to obtain configurable information of the intelligent device by a Near Field Communication (NFC) tag on the intelligent device, and to display the information of the intelligent device on a display screen; and receive the configuration information set by a user according to the information of the intelligent device.

12. The apparatus according to claim 11, wherein the processor is configured to obtain configurable information of the intelligent device by the NFC tag on the intelligent device by:

activating the NFC tag on the intelligent device by a NFC antenna with a near field communication technology;

establishing NFC connection with the intelligent device; and obtaining the configurable information of the intelligent device stored in the NFC tag.

13. A non-transitory storage medium having stored therein instructions that, when executed by a processor of a terminal device, causes the terminal device to perform acts comprising:

storing configuration information, wherein the configuration information comprises identifications that identify a plurality of intelligent devices, a sequence of controlling the plurality of intelligent devices, an execution operation corresponding to each intelligent device, and an execution condition corresponding to each execution operation; wherein the plurality of target intelligent devices comprise a target intelligent device corresponding to a target execution condition in the configuration information and other intelligent devices following a target execution operation of the target intelligent device in the sequence; and the target execution operation comprises the execution operation corresponding to the target intelligent device, when the target execution condition is satisfied, determining a target intelligent device and the target execution operation by querying the configuration information according to the target execution condition; and instructing the target intelligent device to perform the target execution operation; and instructing other intelligent devices following the target execution operation of the intelligent device to perform corresponding target execution operations according to the sequence pre-stored in the target intelligent device.

14. The non-transitory storage medium according to claim 13, wherein the execution operation comprises: one or more control operations executed on one intelligent device.

15. The non-transitory storage medium according to claim 13, wherein the execution operation comprises at least one of starting of the intelligent device, stopping of the intelligent device, temperature regulation of the intelligent device, and air speed adjustment of the intelligent device.

16. The non-transitory storage medium according to claim 13, wherein instructing the target intelligent device to perform the target execution operation comprises:

sending encoded information to the target intelligent device via Bluetooth, or in a manner of sending an infrared signal or sending a wireless signal based on WIFI;

wherein the encoded information comprises the target execution operation of the target intelligent device, such that the target intelligent device performs the target execution operation according to the encoded information.

17. The non-transitory storage medium according to claim 13, wherein the stored instructions further cause the terminal device to perform acts comprising:

obtaining configurable information of the intelligent device by a Near Field Communication (NFC) tag on the intelligent device, and displaying the information of the intelligent device on a display screen; and receiving the configuration information set by a user according to the information of the intelligent device.

* * * * *